US 9,495,441 B2

(12) United States Patent
Bester et al.

(10) Patent No.: US 9,495,441 B2
(45) Date of Patent: Nov. 15, 2016

(54) GROUPING DATA IN A DATABASE

(71) Applicant: International Business Machines Corporation, Armonk, NY (US)

(72) Inventors: Karla Bester, Ridgewood (AU); Allan T. Chandler, Floreat (AU); Mark A. Shewell, Perth (AU); Stephen J. Yates, Beaconsfield (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/053,205

(22) Filed: Feb. 25, 2016

(65) Prior Publication Data
US 2016/0171086 A1  Jun. 16, 2016

Related U.S. Application Data

(63) Continuation of application No. 14/291,839, filed on May 30, 2014.

(51) Int. Cl.
*G06F 17/30* (2006.01)
(52) U.S. Cl.
CPC ... *G06F 17/30598* (2013.01); *G06F 17/30289* (2013.01); *G06F 17/30339* (2013.01)
(58) Field of Classification Search
None
See application file for complete search history.

(56) References Cited

U.S. PATENT DOCUMENTS

| | | | |
|---|---|---|---|
| 5,794,229 A | 8/1998 | French et al. | |
| 6,339,770 B1* | 1/2002 | Leung | G06F 17/30454 |
| 7,567,973 B1 | 7/2009 | Burrows et al. | |
| 8,041,731 B2 | 10/2011 | Bellamkonda et al. | |
| 8,200,668 B2 | 6/2012 | Carlin et al. | |
| 8,510,645 B2 | 8/2013 | Beach et al. | |
| 2003/0055747 A1 | 3/2003 | Carr et al. | |
| 2005/0149505 A1* | 7/2005 | Bossman | G06F 17/30536 |
| 2006/0020580 A1 | 1/2006 | Dettinger et al. | |
| 2006/0129572 A1 | 6/2006 | Cole et al. | |
| 2009/0089248 A1 | 4/2009 | Alexander et al. | |
| 2009/0132470 A1 | 5/2009 | Vignet | |
| 2009/0254232 A1* | 10/2009 | Reichensperger | B66F 9/24 701/20 |
| 2009/0254516 A1 | 10/2009 | Meiyyappan et al. | |
| 2009/0254532 A1 | 10/2009 | Yang et al. | |
| 2009/0319487 A1* | 12/2009 | Carlin | G06F 17/30604 |
| 2010/0030728 A1* | 2/2010 | Chakkappen | G06F 17/30469 707/713 |
| 2013/0166531 A1 | 6/2013 | Valentin | |
| 2014/0095502 A1 | 4/2014 | Ziauddin et al. | |
| 2015/0234867 A1 | 8/2015 | Sharma et al. | |

OTHER PUBLICATIONS

Appendix P—List of IBM Patents or Patent Applications Treated as Related. 2 pages.

* cited by examiner

*Primary Examiner* — Hung Le
(74) *Attorney, Agent, or Firm* — Trentice V. Bolar

(57) ABSTRACT

According to embodiments of the present invention, two or more attributes that are included in a plurality of attributes are aggregated into a group defined by a first data definition language syntax. The first data definition language syntax defines the group as having a groupID and one or more of an attribute definition defined in a comma-separated list and a group definition. The attribute definition is defined by a second data definition syntax. The first data definition language syntax includes the second data definition language syntax. The first data definition language syntax is structured in a manner to allow a database operation associated with the group to be applied to all attributes and/or groups included therein.

3 Claims, 3 Drawing Sheets

GROUPING DATA IN A DATABASE

BACKGROUND

The present disclosure relates generally to the field of database management, and more particularly to grouping data in databases. Database systems typically store data in tables that are defined using a data definition language, wherein each table has a defined set of columns, and the data is stored in the table in rows such that each column of each row contains the same kind of data. For example, a "department table" could describe each department in an enterprise with columns identifying, for example, the department manager and the department to which they report along with additional information, such as the department location.

Rows in such a table may contain information for one department. Data is typically retrieved from a database table for direct use by a user. Retrieval is typically accomplished using a query language, for example the structured query language (SQL). Within the SQL standard, the SELECT statement is typically utilized for data retrieval and limited to a choice between selecting all columns or specifying each column for which data should be retrieved. Current database data retrieval solutions utilize "views" or "materialized query tables". A view is a kind of virtual table where the retrieved data and any required transformations are encapsulated in the definition of the view.

SUMMARY

According to embodiments of the present invention, two or more attributes included in a plurality of attributes into a group defined by a first data definition language syntax. The first data definition language syntax defines the group as having a groupID and one or more of an attribute definition defined in a comma-separated list and a group definition. The attribute definition is defined by a second data definition syntax. The first data definition language syntax includes the second data definition language syntax. The first data definition language syntax is structured in a manner to allow a database operation associated with the group to be applied to all attributes and/or groups included therein.

DETAILED DESCRIPTION

Figure 1:
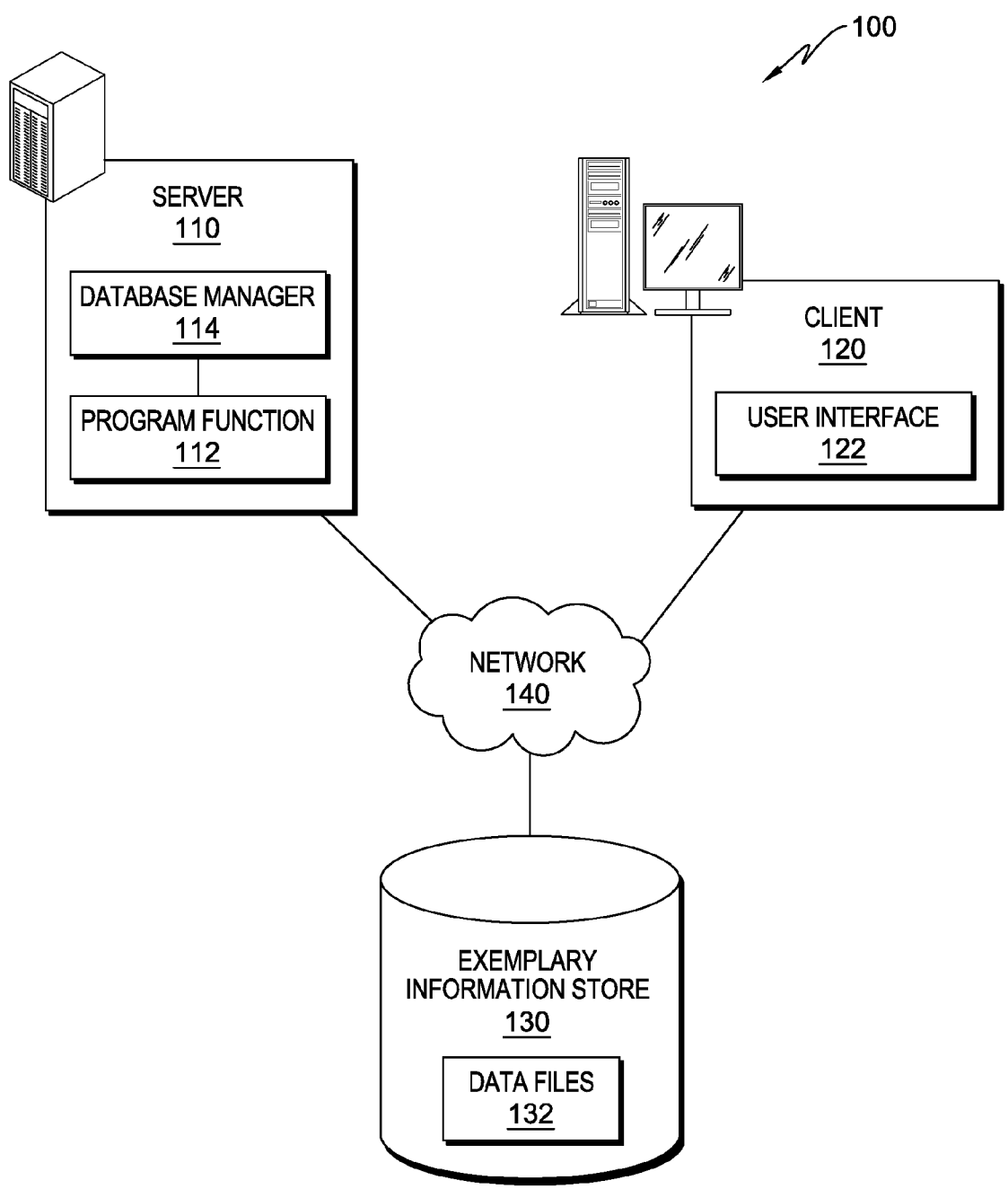
FIG. 1 is a block diagram illustrating an environment, in accordance with an embodiment of the present invention.
Figure 2:
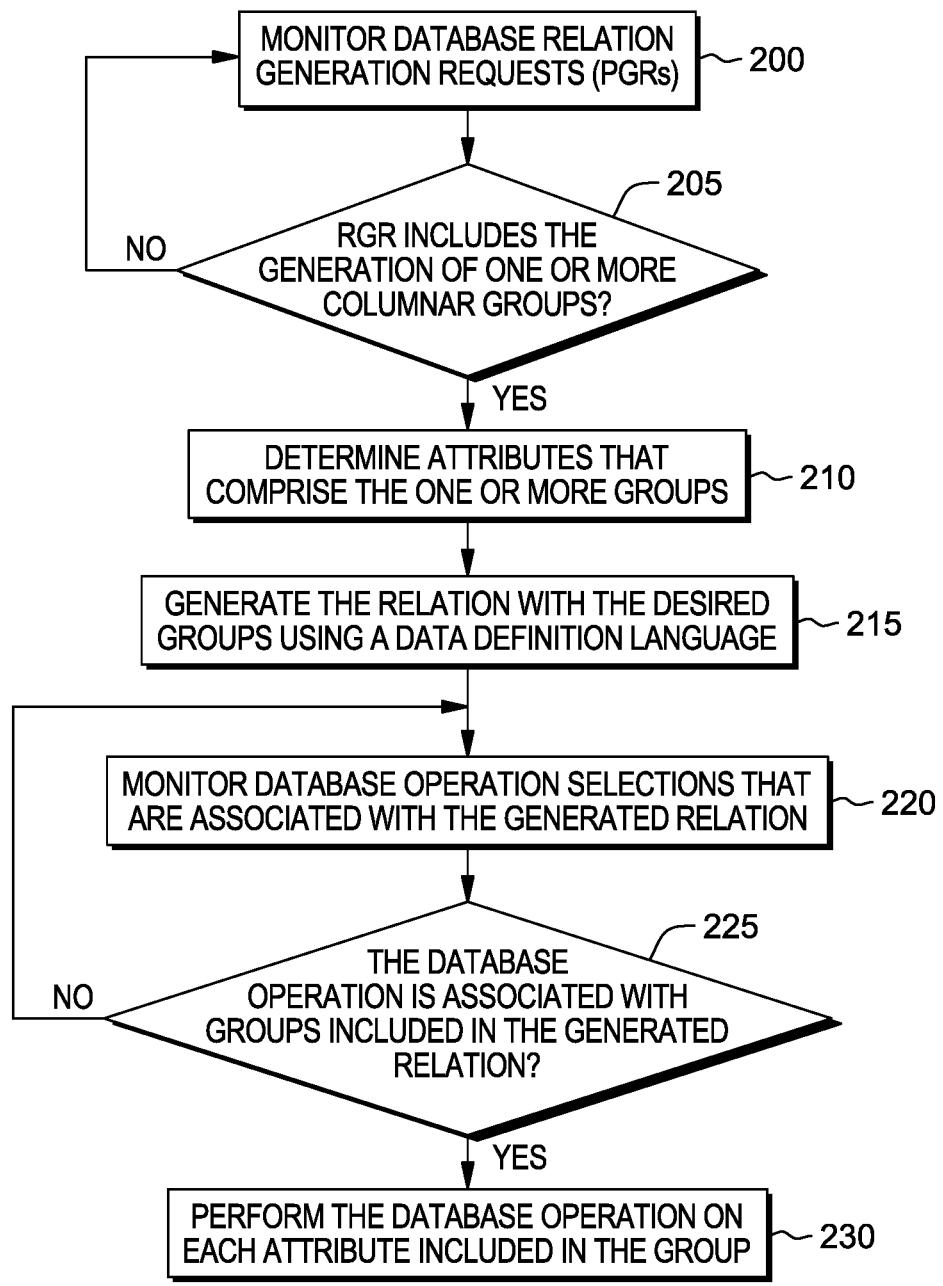
FIG. 2 is a flowchart depicting the operational steps of a program function, in accordance with an embodiment of the present invention.
Figure 3:
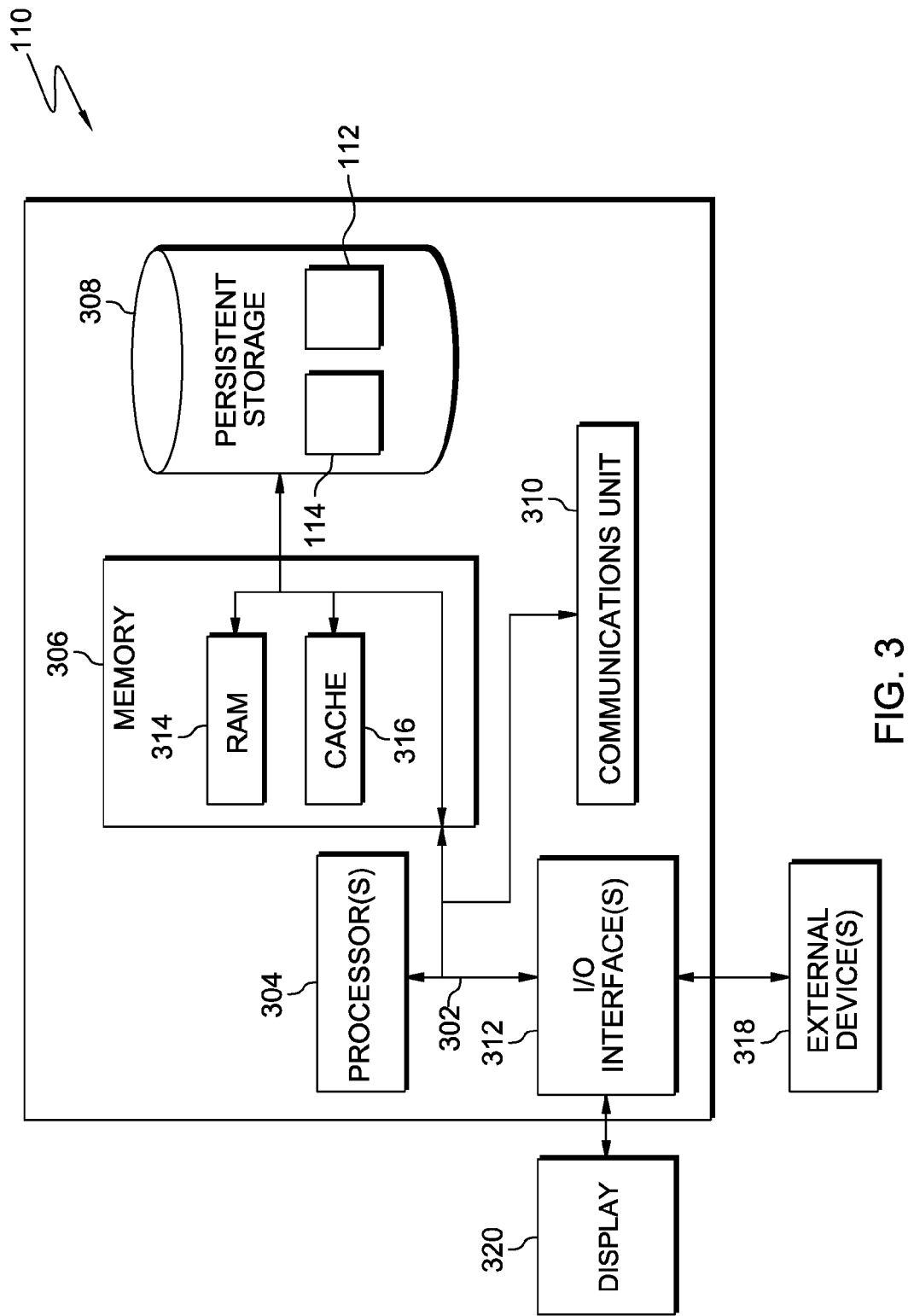
FIG. 3 depicts a block diagram of components of the server executing the program function, in accordance with an embodiment of the present invention.

With reference now to FIGS. 1-3.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java™ Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Relational database systems store data in tables (relations) that are typically defined using a data definition language (DDL), wherein each relation comprises a defined set of columns (attributes), and data is stored in rows (tuples) such that a single attribute of each tuple contains the same kind of data. For example, a "department" relation could describe each department in an enterprise with attributes identifying, for example, the department manager and the department to which they report along with additional information, such as department location. Tuples in such a relation may contain information for one department. Data is typically retrieved from a database for direct use by a user. Retrieval can be accomplished using a query language, for example, structured query language (SQL). Certain aspects of the current invention seek to provide a method, program product, and computer system to manipulate one or more groups of attributes. In one embodiment, group creation reduces the need to generate a new view for each required perspective on the data. Views are relations that have their data calculated at query time and may be queried as they would in a persistent database collection object. Attribute groups can increase the efficiency of data retrieval and/or manipulation.

In the SQL standard, the SELECT statement, which is typically utilized for data retrieval, is typically limited to either selecting all attributes or specifying each attribute for which data should be retrieved. Certain aspects of the current invention seek to organize database attributes into definable attribute groups (groups) using a DDL in such a manner to allow the groups to be manipulated in unison using a query language, such as SQL. Embodiments of the present invention will now be described in detail with reference to the Figures. FIG. 1 is a block diagram illustrating an environment, generally designated 100, in accordance with an embodiment of the present invention.

Environment 100 includes exemplary client 120, exemplary information store 130, and server 110, all interconnected over network 140. Network 140 can be, for example, a local area network (LAN), a wide area network (WAN), such as the Internet, or a combination of the two, and can include wired, wireless, or fiber optic connections. Network 140 may be a distributed computing environment utilizing clustered computers and components that act as a single pool of seamless resources, as is common in data centers and with cloud computing applications or "clouds". In general, network 140 can be any combination of connections and protocols that will support communications between client 120, exemplary information store 130, and server 110.

In various embodiments of the present invention, client 120 and server 110 may be a laptop computer, a tablet computer, a netbook computer, an enterprise server, a personal computer (PC), a desktop computer, a personal digital assistant (PDA), a smart phone, or any programmable electronic device capable of communicating with a computing device via network 140. Client 120 is a computing device used to access and manipulate data that is included in a database, in accordance with an embodiment of the present invention. Client 120 sends, via network 140, instructions to and/or receives instructions from server 110. Client 120 manipulates information that is included in exemplary information store 130, such as information that is included in data files 132. Client 120 allows a user to generate and transmit, via network 140, query language statements, such as relation generation requests (discussed below), to server 110. In certain embodiments, client 120 includes user interface 122, which is a graphical and/or text-based user interface. User interface 122 allows users of client 120 to generate and transmit query language statements to server 110. In an embodiment, user interface 122 is used to view information received from server 110, via network 140.

Exemplary information store 130 is an information repository that includes data files 132. Although not shown, exemplary information store 130 may comprise one or more data stores. Exemplary information store 130 comprises a relational database. In an embodiment, data files 132 may comprise any data type, including quantities, characters, and/or symbols on which database operations can be performed. Data files 132 comprise data that is organized in a manner that is compatible with a relational database. Data files 132 also comprise information that is defined using a DDL syntax, such as SQL-DDL. Data files 132 comprise data that is organized into relations having attributes and tuples. Relations can be associated with metadata, such as constraints on the relation or on the values that comprise particular attributes included therein.

In various embodiments of the present invention, server 110 is in communication with exemplary information store 130 and client 120 via network 140. Server 110 includes database manager 114 and program function 112. Server 110 may include internal and external hardware components, as depicted and described in further detail with respect to FIG. 3 (discussed below). Server 110 is in communication with exemplary information store 130 and client 120 via network 140, in accordance with an embodiment of the present invention. Server 110 includes database manager 114 and program function 112, in accordance with an embodiment of the present invention. In other embodiments, database manager 114 and/or program function 112 are included in an information repository or a computing device that communicates with server 110 via network 140.

Database manager 114 is software that facilitates the defining, generation, querying, update, and/or administration of databases, in accordance with an embodiment of the present invention. In certain embodiments, program function 112 includes some or all of the functionality of database manager 114 (discussed below). Database manager 114 is included in server 110, in accordance with an embodiment of the present. Database manager 114 allows a user to define, generate, query, update, manage, and/or administration of databases, such as databases included in exemplary information store 130. Database manager 114 can execute query language instructions, such as SQL instructions.

Program function 112, which is included in server 110, is in communication with database manager 114, in accordance with an embodiment of the present invention. Program function 112 is software that organizes attributes into groups in such a manner that allows the groups that comprise the attribute to be manipulated at once using a query language, in accordance with an embodiment of the present invention. Program function 112 can manipulate information that is included in a relational database, such as information included in data files 132. Program function 112 transmits instructions to database manager 114. Program function 112 defines a group, which comprises two or more attributes, using DDL syntax, such as SQL-DDL.

The data definition syntax can define groups as having a groupID and one or more attribute definitions that are organized in a comma-separated list, for example,
  group-name (attribute-definition 1, attribute-definition 2)
wherein the group generated includes two attributes. Hence, the group, INPUT, which is defined as follows:

```
INPUT    (
    INPUT_LOCAL         REAL,
    INPUT_SEC           REAL,
)
``` defines a group having two attributes, INPUT_LOCAL and INPUT_SEC, both of which are defined as real data types.

Attribute definitions comprise one or more of an attributeID, associated data type/domain, required data, and default value. In an embodiment, program function 112 defines attributes using a SQL-related syntax, for example,

| attribute-name | data type | default value |
|---|---|---|

Relations are defined in a manner to comprise group definitions, which further comprise attribute definitions. In an embodiment, program function 112 defines a group in a manner that allows one or more attributes to be added to the group when the attributes meet a predetermined group criterion. In other embodiments, program function 112 defines a group in a manner that adds one or more attributes to a particular group when the attributes share a property with the group.

For example, defining the default value of a group as, for example, CONTAINS("NAME") aggregates all attributes that include the word "NAME" into an implicit group. In certain embodiments, program function 112 defines a group in a manner that allows that particular group to update itself when attributes meet a predefined group criteria. For example, defining the default value of a group as, for example, CHAR-CLASS aggregates all attributes that contain objects having one or more of a varchar, text, and char data type. In certain embodiments, program function 112 defines the group in a manner to include two or more groups.

FIG. 2 is a flowchart depicting operational steps of program function 112, in accordance with an embodiment of the present invention. In this particular example, client 120 transmits the following instructions:

```
SQL CREATE TABLE HOURLY
    ( TIMESTAMP (
        DATE                DATE        NOT NULL
        TIME                TIME        NOT NULL
        ),
        TRAN _NAME          CHAR (8)    NOT NULL
        SYS (
            SYSTEM_ID       CHAR (4)
            SYSPLEX_NAME    CHAR (8)
        ),
        INPUT (
            INPUT_LOCAL     REAL,
            INPUT_SEC       REAL,
            INPUT_CSQ       REAL,
        ),
        OUTPUT (
            OUTPUT_LOCAL    REAL,
            OUTPUT_SEC      REAL,
            OUTPUT_CSQ      REAL,
        ),
        IO (
            INPUT,
            OUTPUT
        ),
        CSQ (
            NAME LIKE '%+_CSQ' ESCAPE '+'
        ),
        KEY (
            TIMESTAMP,
            TRAN_NAME
        ),
    PRIMARY KEY (
        DATE            ,
        TIME            ,
        TRAN_NAME
        )
    )
``` which generates a relation having a plurality of groups defined using a DDL.

Program function 112 monitors relation generation requests (step 200). For example, program function 112 monitors relation generation requests (TGRs) that occur in environment 100. Program function 112 determines whether the TGR includes the generation of a relation having one or more groups (decisional 205). For example, program function 112 monitors TGRs that are received by database manager 114. In an embodiment, TGRs are generated by client 120, for example using user interface 122.

If program function 112 determines that the received TGR generates a relation having one or more groups ("yes" branch decisional 205), then program function 112 determines the attributes that comprise the one ore more groups (step 210). For example, program function 112 determines that the aforementioned relation generation request defines the generation of a table (relation), HOURLY, having seven groups, TIMESTAMP, SYS, INPUT, OUTPUT, IO, and CSQ.

For example, program function 112 determines that the group TIMESTAMP includes two attributes, DATE and TIME. If program function 112 determines that the received TGR does not generate a relation having one or more groups ("no" branch decisional 205), then program function 112 returns to step 200. Program function 112 generates the relation with the desired groups, which comprise the determined attributes, using a data definition language (step 215). For example, program function 112 generates the HOURLY using a data definition language that is associated with a query language, such as SQL-DDL. Program function 112 monitors database operation selections that are associated with the generated relation (step 220). For example, program function 112 receives the following instruction:

SELECT ALL TIMESTAMP, SYS, INPUT FROM HOURLY.

Program function 112 interprets the above instruction as a request to display the data that is included in the TIMESTAMP, SYS, and INPUT groups of the HOURLY table. Program function 112 determines whether the database operation is associated with groups that are included in the generated relation (decisional 225). If program function 112 determines that the database operation is not associated with groups that are included in the generated relation ("no" branch decisional 225), then program function 112 returns to step 220. For example, if program function 112 determines that the database operation is associated with the "ABC" attribute, which is not included in HOURLY, then program function 112 continues to monitor database operations.

If program function 112 determines that the database operation is associated with one or more groups that is included in the generated relation ("yes" branch decisional 225), then program function 112 performs the database operation on each attribute and/or group included therein according to the group's definition (step 230). For example, program function 112 determines that the TIMESTAMP, SYS, and INPUT groups are included in HOURLY and displays TIMESTAMP, SYS, and INPUT in the order that they were defined in the original group definition.

FIG. 3 depicts a block diagram of components of server 110 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

A non-transitory computer readable storage medium embodiment herein is readable by a computerized device. The non-transitory computer readable storage medium stores instructions executable by the computerized device to perform a method that tests integrated circuit devices to measure a voltage overshoot condition.

Server 110 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 306 can include any suitable volatile or non-volatile computer readable storage media.

Program function 112 and database manager 114 are stored in persistent storage 308 for execution by one or more of the respective computer processor(s) 304 via one or more memories of memory 306. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of client 120 and exemplary information store 130. In these examples, communications unit 310 includes one or more network interface cards. Communications unit 310 may provide communications through the use of either or both physical and wireless communications links. Program function 112 and database manager 114 may be downloaded to persistent storage 308 through communications unit 310.

I/O interface(s) 312 allows for input and output of data with other devices that may be connected to server 110. For example, I/O interface(s) 312 may provide a connection to external device(s) 318 such as a keyboard, a keypad, a touch screen, and/or some other suitable input device. External device(s) 318 can also include portable computer readable storage media such as, for example, thumb drives, portable optical or magnetic disks, and memory cards. Software and data used to practice embodiments of the present invention, e.g., program function 112 and database manager 114, can be stored on such portable computer readable storage media and can be loaded onto persistent storage 308 via I/O interface(s) 312. I/O interface(s) 312 also connects to a display 320. Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

What is claimed is:

1. A method comprising:
providing a table in a relational database, with the table comprising a plurality of columns with each column including a column name that describes an attribute corresponding to attribute values of the column;
defining a group of columns;
receiving user input;
responsive to the user input, adding, by machine logic, a first column of the plurality of columns to the group;
adding, by machine logic, a second column of the plurality of columns to the group based on predetermined selection criteria; and
receiving an SQL (Structured Query Language) statement using group names corresponding to the group of columns to perform actions on the columns of the group;
wherein the predetermined selection criteria is based upon at least one of the following characteristics of the second column: text contained in a second column name and/or the type of data stored in the second column.

2. The method of claim 1 wherein the definition of the group includes:
receiving a first relation generation request; and
responsive to the first relation generation request, generating a first group including a plurality of first-group columns of the plurality of columns.

3. The method of claim 1 wherein the addition of the second column uses a data definition language (DDL).

* * * * *